A. A. RUTTAN & C. E. HUTCHINGS.
SECURING DEVICE FOR CAMERA BACKS.
APPLICATION FILED JAN. 11, 1911.
1,030,433.
Patented June 25, 1912.
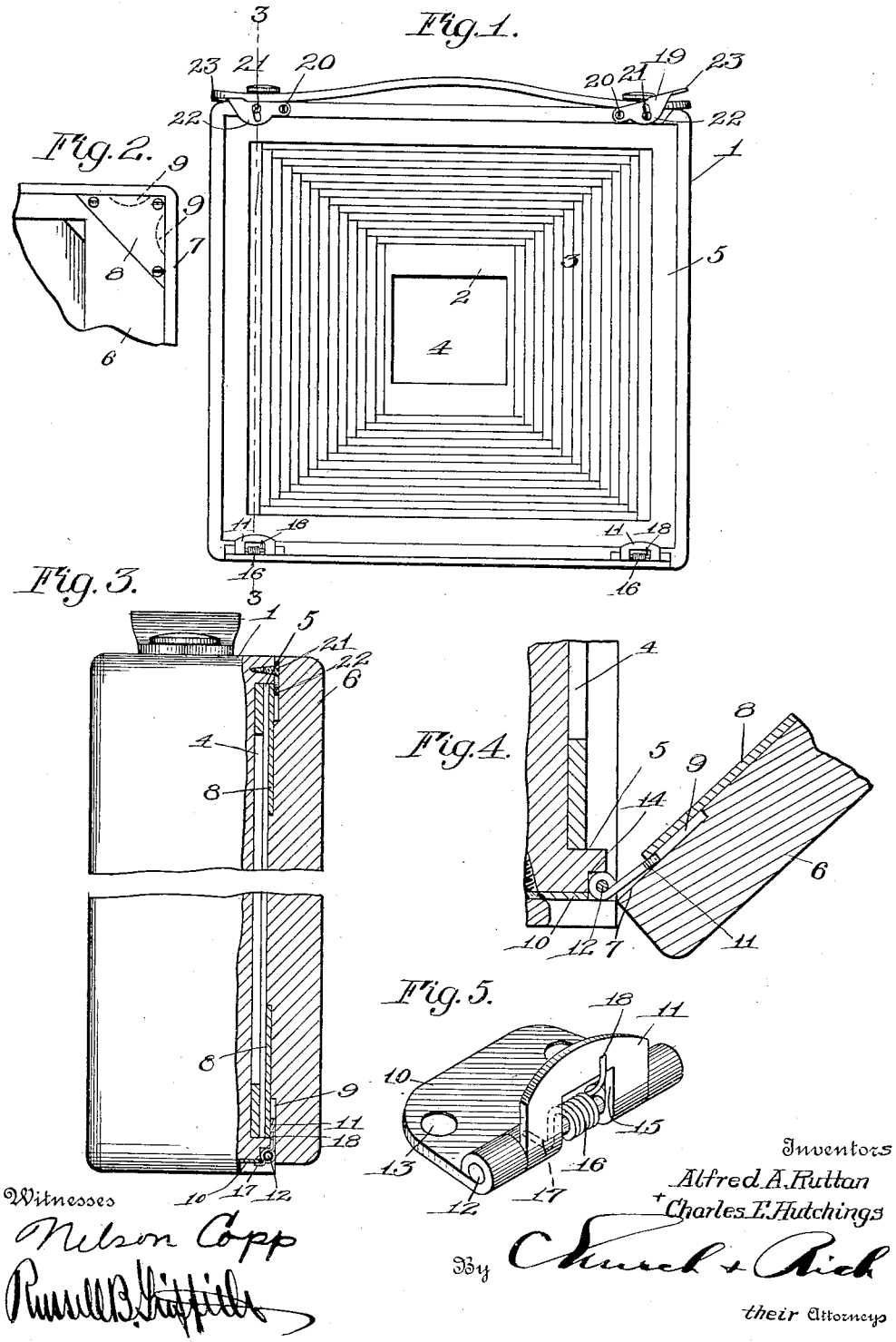
Inventors
Alfred A. Ruttan
+ Charles E. Hutchings

UNITED STATES PATENT OFFICE.

ALFRED A. RUTTAN AND CHARLES E. HUTCHINGS, OF ROCHESTER, NEW YORK, ASSIGNORS TO EASTMAN KODAK CO., OF ROCHESTER, NEW YORK, A CORPORATION OF NEW YORK.

SECURING DEVICE FOR CAMERA-BACKS.

1,030,433.   Specification of Letters Patent.   Patented June 25, 1912.

Application filed January 11, 1911. Serial No. 602,048.

*To all whom it may concern:*

Be it known that we, ALFRED A. RUTTAN and CHARLES E. HUTCHINGS, both of Rochester, in the county of Monroe and State of New York, have invented certain new and useful Improvements in Securing Devices for Camera-Backs; and we do hereby declare the following to be a full, clear, and exact description of the same, reference being had to the accompanying drawings, forming a part of this specification, and to the reference-numerals marked thereon.

Our present invention relates to photography and more particularly to photographic cameras, and it has for its object to provide simple and convenient means for securing a detachable back to a camera body.

A further object of the invention is to provide a securing device which will hold the back against the camera body in an efficient manner and in such a way as to provide an absolutely light-tight joint, the efficiency of which cannot be reduced by the wear or strain incident to the frequent removal and replacement, and particularly the careless removal and replacement, of the back.

To these and other ends the invention consists in certain improvements and combinations of parts all as will be hereinafter more fully described, the novel features being pointed out in the claims at the end of the specification.

In the drawings: Figure 1 is a rear elevation of a camera body adapted for use in connection with a removal back, the latter being shown removed and the whole constructed in accordance with and illustrating one embodiment of my invention; Fig. 2 is a detail front elevation of one such portion of the back as is engaged by the hereinafter described latches and securing devices on the body; Fig. 3 is a side elevation of the camera, as a whole, with the back in place on the body, the view being partly in section on the line 3—3 of Fig. 1; Fig. 4 is an enlarged detail view, also in section on the line 3—3 of Fig. 1, but showing the position assumed by one of the securing devices when the back is tilted rearwardly during removal, and Fig. 5 is a perspective view of one of the securing devices.

Similar reference numerals throughout the several figures indicate the same parts.

The camera in connection with which we have illustrated our present improvements comprises, generally, a rectangular body 1, front 2 and connecting bellows 3. At the rear of the body is the exposure opening 4 having a rabbeted edge 5 to receive the back 6 of a usual or any preferred construction and which commonly carries the ground glass and a pocket for the insertion of a plate holder. The edges of the back are also provided with a complementary rabbet 7 and at the corners this rabbet is preferably bordered by re-inforcing plates 8 beneath which are recesses 9 extending in the general plane of the back and which form a wall of the recess.

At one edge of the body, in the region of its rear opening, we provide a pair of securing devices one of which is illustrated alone in Fig. 5 and each of these comprises a pair of leaves 10 and 11 hingedly connected by a pintle 12. The leaf 10 is secured, as by fastening devices passing through apertures 13 therein, to what, in the drawings, may be termed the bottom of the body 1 which latter is preferably recessed at the corner 14 to receive the knuckle of the hinge. The other leaf 11 is preferably provided with an intermediate cutaway portion 15 to accommodate a spring 16 that is coiled about the pintle and has one end 17 engaging the leaf 10, while the other end 18 coöperates with the leaf 11. The tendency of this spring is to normally hold the leaf 11 in the positions of Figs. 1 and 3 in which it projects over the rabbeted edge 5 of the opening in the rear of the body.

At the opposite or what has been identified as the top side of the said opening we provide the body 1, in the present instance, with a pair of manually operated catches 19 pivoted at 20 to move in a vertical plane on guiding pins 21 and having portions 22 that correspond to the before described securing means 11 and are capable of being moved into and out of similar operative positions in which they project over the edge of the opening in the body by means of horizontally turned finger portions 23 on the catches.

The back 6 of the present embodiment has been shown to be of the reversible type in that it is square and has the recesses 9 arranged on each side of each corner so that no matter in what position it is applied to the body one such recess will be presented in a position to receive each of the securing leaves 11 and each of the catches 19.

In applying the back to the body, it is held very nearly in a vertical plane in rear thereof and its lower edge advanced so that by a downward movement the securing members 11, which are then in the normal positions of Figs. 1 and 3, will engage within two of the recesses 9. The catches 19 being in the raised position shown at the right in Fig. 1, the back is then pressed forwardly against the body so that the rabbets 5 and 7 on each coöperate properly all around after which the said catches are pressed downwardly to operative position and the back thus held tight against the body.

The above operation could be accomplished were the securing parts 11 rigid in their described position, but in such case during the removal of the back, which is accomplished by a reversal of the described operations, there would be a tendency to cause considerable strain on said parts and on the walls of the recesses 9 in the back, notably the plate 8, in the present instance, particularly in case the back is carelessly tilted rearwardly to greater than a necessary degree before it is moved upwardly and disengaged. Such strain would ultimately cause either a loosening of the securing member or bending thereof resulting in an inaccurate or forced coöperation of the nicely fitted parts that would ultimately destroy the light-tight character of the joint between the back and the body. With our improvements, however, the securing leaf or part 11 is permitted by its spring 16 to yield rearwardly with the back to any necessary or required degree, as illustrated particularly in Fig. 4, when the back is tilted, the movement of the latter being on substantially the same center as that of the leaf. The spring 16, however, is of sufficient strength to maintain the leaf in a normal position that is entirely adequate to the purpose of holding the back tight against the body and to resist any slight strain tending to cause a separation to which the back might be subjected in the ordinary use of the instrument. Nevertheless such strength is not sufficient to cause too great a strain against the walls of the recesses 9.

We claim as our invention:

1. The combination with a camera body having an opening in the rear to receive a back, of a securing device for the back comprising a pair of hinged leaves, one of which is attached to the camera body and the other of which is spring actuated and normally projects over the edge of the opening to detachably engage the back at one edge, said last mentioned leaf being adapted to yield rearwardly as the back is tilted on that edge during removal.

2. The combination with a camera body having an opening in the rear to receive a back, of a spring actuated securing device mounted on the body to normally project over the edge of the opening and detachably engage the back at one edge, said device being adapted to yield rearwardly as the back is tilted on that edge during removal.

3. The combination with a camera body having an opening in the rear provided with a rabbeted edge to receive a back, of a spring actuated securing device mounted on the body to normally project over and against the edge of the rabbet and detachably engage the back at one edge, said device being adapted to yield rearwardly as the back is tilted on that edge during removal.

4. The combination with a camera body having an opening in the rear to receive a back, of a spring actuated securing device pivoted to the body to normally project over the edge of the opening and detachably engage the back at one edge, said device being adapted to yield rearwardly on its pivot as the back is tilted rearwardly on substantially the same center during removal.

5. The combination with a camera body having an opening in the rear to receive a back and a seat for the latter surrounding the opening, of a spring actuated securing device pivoted to the rear of the body to normally overhang the seat in spaced relation to the bottom thereof and a back having a portion adapted to engage between the seat and securing device, the latter being adapted to yield rearwardly as the back is tilted rearwardly during removal.

ALFRED A. RUTTAN.
CHARLES E. HUTCHINGS.

Witnesses:
RUSSELL B. GRIFFITH,
NELSON COPP.

Copies of this patent may be obtained for five cents each, by addressing the "Commissioner of Patents, Washington, D. C."